United States Patent Office 2,802,959
Patented Aug. 13, 1957

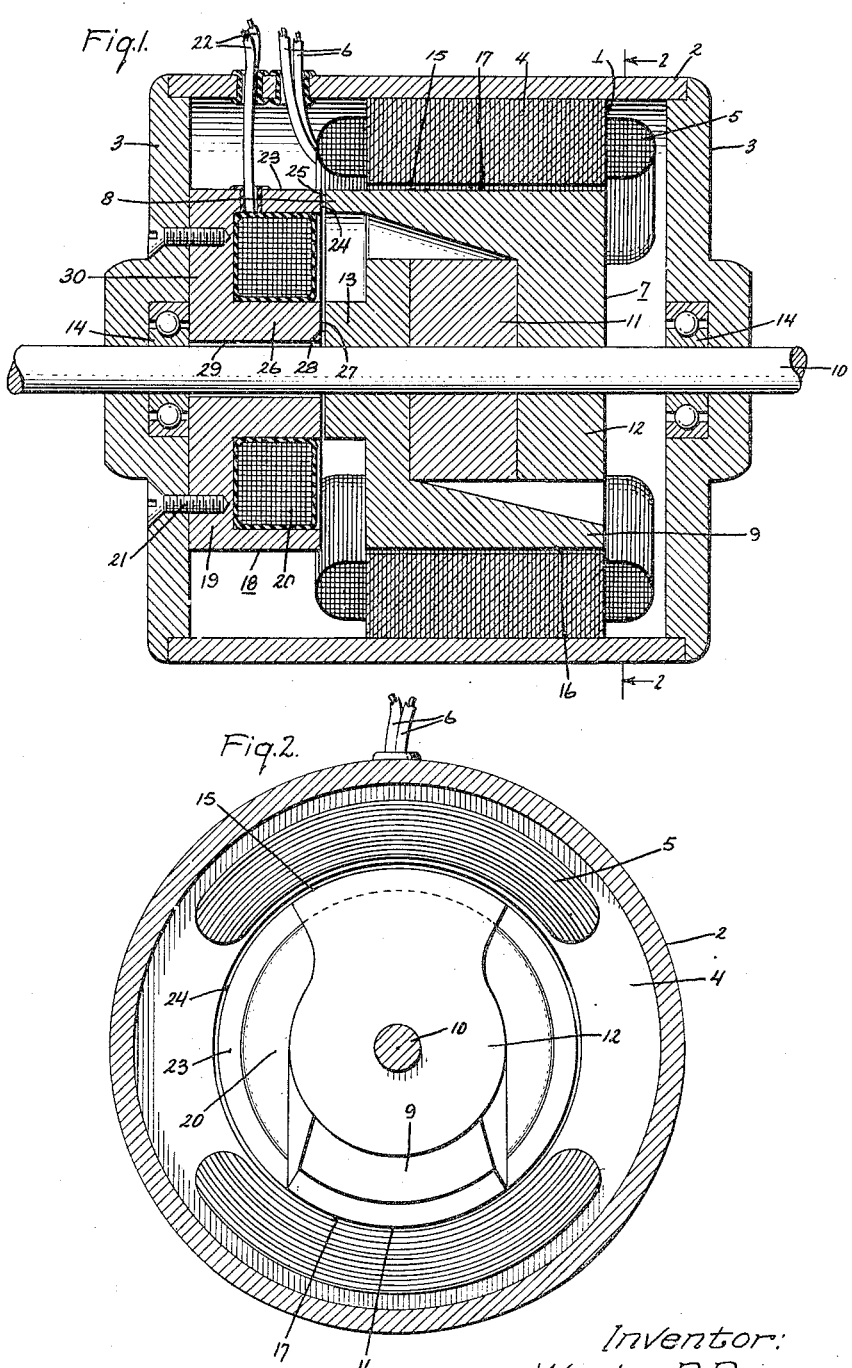

2,802,959

DYNAMOELECTRIC MACHINE

Wesley R. Powers, Fort Wayne, Ind., assignor to General Electric Company, a corporation of New York Application April 27, 1956, Serial No. 581,170

5 Claims. (Cl. 310—156)

This invention relates to dynamoelectric machines, and more particularly to such machines having permanent-magnet excited Lundell-type fields.

The Lundell-type field structure is one frequently used in dynamoelectrc machines, particularly alternators. In this construction, a first group of one or more circumferentially arranged axially extending evenly spaced poles is provided, with a second similar group having its poles interspaced between the poles of the first group. A permanent magnet is arranged between the first and second groups of poles to polarize the first group at one polarity and the other group at the opposite polarity. The Lundell-type field structure is generally used as the rotatable member of a machine positioned concentrically within the stationary member, with the outer peripheries of the poles defining the airgap surface with the surrounding stator.

In the conventional Lundell-type field structure, as used in alternators, the fact that the excitation has been provided by a permanent magnet has caused some difficulty in providing an economical and effective control for the output voltage of the machine. In order to effect such control, it has been found necessary either to provide a coil on the field structure itself, in which case a slip ring construction is needed to provide power to the rotating coil, or else to provide a special winding on the stator which depends upon the saturation in the stator iron for its effect. The former of these alternatives requires the increased cost of the slip ring arrangement needed to provide power to the rotating coil. The second alternative requires a relatively costly coil construction which has proved very difficult to manufacture, and which may distort the wave shape of the output voltage so that it ceases to be a pure sine wave. It is, consequently, most desirable to provide an alternator having a Lundell-type permanent-magnet field in which means are provided for readily controlling the output voltage with a minimum amount of expense and difficulty.

It is, therefore, an object of this invention to provide an improved alternator having a Lundell-type permanent magnet excited field with an improved output voltage control arrangement.

In one aspect thereof, the invention provides an alternator which has a first stationary member with a magnetic core and an output coil positioned thereon. A rotatable member is concentrically positioned within the stationary member and has two groups of axially extending interspaced poles of magnetic material in the usual manner of a Lundell-type structure. A permanent magnet is positioned between the groups to polarize the first group at one polarity and the second group at the opposite polarity so as to furnish the necessary excitation for the field member. A second stationary member is provided which includes a core of magnetic material and a direct-current excited coil positioned on the core so as to magnetize the core when the coil is energized. The core of the second stationary member is positioned at one end of the field member magnetically adjacent each pole of one of the groups so as to complete a flux path from each such pole back to the magnet.

This provides, in effect, a control of the amount of leakage flux which will be permitted to flow from the end of each pole so controlled. The greater the energization of the direct current coil, the less the amount of leakage flux which is permitted to escape from the pole and the greater the amount of useful flux which will be forced to pass across the airgap to the stator. If the direct current coil is oppositely energized, the amount of leakage flux will be increased instead of decreased, thus enlarging the range of control of the invention. The fact that control of the output voltage is effected through variation of the leakage flux means that the cross section of the second stationary member need only be large enough to handle leakage flux, thus allowing space for a larger coil, and a greater amount of control.

The features of the invention which are believed to be novel are set forth with particularity in the appended claims. The invention itself, however, both as to its organization and method of operation, together with further objects and advantages thereof, may best be understood by reference to the following description taken in connection with the accompanying drawing.

In the drawing,

Figure 1 is a side view in cross section of the improved alternator construction of this invention; and Figure 2 is a view along line 2—2 in Figure 1.

Referring now to the figures of the drawing, there is shown an alternator having a stator member 1 rigidly secured to tubular housing member 2 which in turn cooperates with a pair of end shields 3 to form an enclosure for the machine. Stator 1 includes a core 4, usually made up of a stacked plurality of thin laminations of magnetic material, with a suitable output winding 5 positioned thereon. As shown, winding 5 is suitable for providing single-phase alternating-current power through leads 6, but it will be understood that any suitable alternating-current output coil may be provided as desired. A rotatable field member generally indicated at 7, is concentrically positioned within stator 1 and is supported in rotatable relation thereto by bearings 14 respectively secured within end shields 3. The rotatable field member is of the Lundell type in that it has two groups 8 and 9 of poles of magnetic material both rigidly secured to a shaft 10 on opposite sides of a magnet 11 which is also secured to rotate with shaft 10. Magnet 11 is axially magnetized so that inner portions 12 and 13 of pole groups 8 and 9 respectively are within the magnetic influence of opposite poles of the magnet.

The outer surfaces 15 and 16 respectively of pole groups 8 and 9 are arranged magnetically adjacent the inner surface of stator 1 so as to form an airgap 17 therewith. Generation of alternating current within coil 5 is effected by rotation of member 7; the output of coil 5 is primarily dependent upon the amount of flux linking each of pole groups 8 and 9 to stator core 4.

A second stationary member, generally indicated at 18, includes an annular core 19 of magnetic material, provided with a U-shaped cross section, and a coil 20 positioned within the U of the core; member 18 may be secured in position by any desired means such as threaded members 21 which secure the member 18 to one of the end shields 3. Coil 20 is adapted to be connected across a source of direct current power (not shown) by means of suitable conductors 22. The U-shaped cross section is provided by two axially extending radially spaced parts 23 and 26 joined by a radially extending part 30. The outer part 23 of core 19 is aligned with the poles of group 8 and is arranged with an end 24 magnetically adjacent end 25 of pole group 8 so as to define an axial parasite gap between them. In similar fashion, the inner part 26 of core 19 has its end 27 arranged magnetically adjacent end 28 of part 13 of pole group 9. Suitable running clearance is provided between the inner surface 29 of core 19 and rotatable shaft 10.

With this construction, core 19 completes a flux path from pole group 8 back to magnet 11 and the leakage flux from the end of pole group 8 is directly controllable by the resistance offered to this flux by core 19. The amount of flux which is permitted to become leakage flux has a direct bearing on the amount of flux which is useful in linking the pole group 8 to stator core 4. Thus, control of the leakage flux provides an effective control of the flux used to produce the alternating current within coil 5. Upon energization of coil 20 with direct current of suitable polarity through conductors 22, core 19 will be magnetized so as to oppose the flux attempting to leak from pole group 8 across to the core 19. In this manner, the amount of flux forced to useful work may be increased to a maximum by increasing the energization of coil 20 until there is little or no leakage flux across the gaps between surfaces 24 and 25 and surfaces 27 and 28; conversely, the leakage flux may be increased by decreasing the energization of coil 20 to the zero level. In addition, the useful output of flux from pole group 8 may be further decreased by energization of coil 20 by direct current of the opposite polarity from that previously used so that the leakage flux is effectively aided rather than hindered. This serves further to increase the range of control provided by coil 20 and core 19 of member 18.

It will be observed from the foregoing that effective control of the alternating current output is obtained through use of member 18, and that the control is achieved by a stationary member which eliminates the necessity for slip rings to supply energy to a rotating coil. The stationary member also is of a relatively simple type to manufacture and assembly as opposed to previously used coils which were positioned on the stator and required relatively complex winding arrangements to effect their purpose; in addition, the control is achieved without any possibility of deformation of the wave form of the alternating current output of coil 5. Since core 19 need carry only the leakage flux, it may be made with a relatively small cross sectional area for the flux path thus increasing the space available for coil 19 and permitting the entire member to be relatively compact.

It will be recognized that while, for illustrative purposes, a single member 18 has been provided to control the leakage flux of pole group 8, a similar member may be provided at the other end of the machine to effect the same purpose for pole group 9 without departing from the scope of the invention. Another obvious modification lies in the provision of a radial parasite gap between the core member 19 and pole group 8 instead of the axial gap which has been shown for illustrative purposes. The same, of course, is true of the gap between core member 19 and pole group 9. While the invention has been explained by describing a particular embodiment thereof, it will be apparent that improvements and modifications in addition to those specifically mentioned may be made without departing from the scope of the invention as defined in the appended claims.

What I claim as new and desire to secure by Letters Patent of the United States is:

1. An alternator comprising a first stationary member having a magnetic core and an output coil positioned on said core; a rotatable member concentrically positioned within said first stationary member and having two groups of axially extending interspaced poles of magnetic material, and a permanent magnet positioned between said groups and arranged to polarize said first group at one polarity and said second group at the opposite polarity thereby to furnish the excitation for said rotatable member; and a second stationary member including a core of magnetic material and a coil adapted to be energized with direct current power positioned thereon to magnetize said second member core, said second member core being positioned at one end of said rotatable member and having a first part magnetically adjacent each pole of one of said groups and a second part magnetically adjacent the other of said groups so as to complete a flux path from each said pole back to said magnet.

2. An alternator comprising a first stationary member having a magnetic core and an output coil positioned on said core; a rotatable member concentrically positioned within said first stationary member and having two groups of axially extending interspaced poles of magnetic material, and a permanent magnet positioned between said groups and arranged to polarize said first group at one polarity and said second group at the opposite polarity thereby to furnish the excitation for said rotatable member, each pole having a radially outer surface positioned to form an air-gap with said magnetic core; and a second stationary member including a core of magnetic material and a direct current coil positioned thereon to magnetize said second member core, said second member core being formed as an annulus and positioned at one end of said rotatable member, said annulus having an outer part magnetically adjacent the end of each pole of one of said groups and physically spaced therefrom to form a parasite gap therewith and having an inner part magnetically adjacent the other of said groups and physically spaced therefrom to form a parasite gap therewith thereby to complete a flux path from each pole of said one group back to said magnet.

3. An alternator comprising a first stationary member having a magnetic core and an output coil positioned on said core; a rotatable field member concentrically positioned within said first stationary member and having two groups of axially extending interspaced poles of magnetic material, and a permanent magnet positioned between said groups and arranged to polarize the first group at one polarity and said second group of the opposite polarity thereby to furnish the excitation for said rotatable member, each pole having a radially outer surface positioned to form an airgap with said magnetic core; and a second stationary member including a core of magnetic material and a direct current coil positioned thereon to magnetize said second member core, said second member core being formed as an annulus and positioned at one end of said rotatable member, said annulus having an outer axially extending part with its end magnetically adjacent the end of each pole of one of said groups and physically spaced therefrom to form an axial parasite gap therewith and having an inner part magnetically adjacent the other of said groups and physically spaced therefrom to form a parasite gap therewith thereby to complete a flux path from each pole of said one group back to said magnet.

4. An alternator comprising a first stationary member having a magnetic core and an output coil positioned on said core; a rotatable field member concentrically positioned within said stationary member and having two groups of axially extending interspaced poles of magnetic material, and a permanent magnet positioned between said groups and arranged to polarize said first group at one polarity and said second group at the opposite polarity thereby to furnish the excitation for said rotatable member, each pole having a radially outer surface positioned to form an airgap with said magnetic core; and a second stationary member including an annular core of magnetic material having two substantially axially extending radially spaced parts and a substantially radially extending part joining said axially extending parts at an end thereof so as to provide said annular core with a substantially U-shaped cross section, and a direct current coil positioned within the U of said annular core in magnetizing relation thereto, said annular core being positioned at one end of said rotatable member with the radially outer axially extending part thereof aligned with and magnetically adjacent the end of each pole of one of said groups and physically spaced therefrom to form an axial parasite gap therewith, the radially inner axially extending part of said annulus being arranged with the end thereof magnetically adjacent the other of said groups and axially spaced therefrom thereby to form an axial parasite gap therewith thereby to complete a flux path from each pole of said one group back to said magnet.

5. An alternator comprising a housing; a first stationary member secured within said housing and having a magnetic core and an output coil positioned on said core; a rotatable member concentrically positioned within said stationary member including a shaft rotatably supported within said housing, two groups of axially extending interspaced poles of magnetic material secured about said shaft, and a permanent magnet positioned between said groups and secured to said shaft, said permanent magnet being arranged to polarize said first group at one polarity and said second group at the opposite polarity thereby to furnish the excitation for said field member, each pole having a radially outer surface positioned to form an airgap with said magnetic core; and a second stationary member secured to said housing including an annular core of magnetic material having two substantially axially extending radially spaced parts and a substantially radially extending part joining said axially extending parts at an end thereof so as to provide said annular core with a U-shaped cross-section, and a direct current coil positioned within the U of said annular core in magnetizing relation thereto, said annular core being secured to said housing at one end of said rotatable member and having its radially outer axially extending part aligned with and magnetically adjacent the end of each pole of one of said group and axially spaced therefrom to form an axial parasite gap therewith, the radially inner axially extending part of said annulus being arranged magnetically adjacent the other of said groups and axially spaced therefrom to form an axial parasite gap therewith thereby to complete a flux path from each pole of said one group back to said magnet, said inner axially extending part being positioned to have a running clearance about said shaft.

References Cited in the file of this patent
UNITED STATES PATENTS 2,564,370     Brainard _____ Aug. 14, 1951